(12) United States Patent
Kim

(10) Patent No.: US 9,028,286 B2
(45) Date of Patent: May 12, 2015

(54) BICYCLE FOR WATER AND LAND

(76) Inventor: Young Ki Kim, Busan (KR)

( * ) Notice: Subject to any disclaimer, the term of this patent is extended or adjusted under 35 U.S.C. 154(b) by 105 days.

(21) Appl. No.: 14/002,121

(22) PCT Filed: Mar. 6, 2012

(86) PCT No.: PCT/KR2012/001624
§ 371 (c)(1),
(2), (4) Date: Aug. 29, 2013

(87) PCT Pub. No.: WO2012/121530
PCT Pub. Date: Sep. 13, 2012

(65) Prior Publication Data
US 2013/0337706 A1    Dec. 19, 2013

(30) Foreign Application Priority Data
Mar. 8, 2011   (KR) .................. 10-2011-0020485

(51) Int. Cl.
| | |
|---|---|
| *B60F 3/00* | (2006.01) |
| *B63B 7/02* | (2006.01) |
| *B62K 15/00* | (2006.01) |
| *B62K 13/00* | (2006.01) |
| *B63H 1/04* | (2006.01) |
| *B63H 5/02* | (2006.01) |
| *B63H 16/20* | (2006.01) |

(52) U.S. Cl.
CPC ............ *B60F 3/0007* (2013.01); *B60F 3/0038* (2013.01); *B62K 15/00* (2013.01); *B60F 3/0084* (2013.01); *B63H 1/04* (2013.01); *B62K 13/00* (2013.01); *B63H 5/02* (2013.01); *B63H 2016/202* (2013.01); *B63H 2016/205* (2013.01)

(58) Field of Classification Search
CPC ............ B63H 16/12; B63H 2016/202; B63H 2016/205; B60F 3/0084; B60F 3/0038; B60F 3/0069; B60F 3/00; B62K 13/00
USPC ............ 440/12.5, 12.62, 12.66, 12.68, 12.7, 440/12.53; 114/353, 354
See application file for complete search history.

(56) References Cited

U.S. PATENT DOCUMENTS

| | | | | |
|---|---|---|---|---|
| 615,871 | A | * | 12/1898 | Müller ............ 440/12.62 |
| 2,757,631 | A | * | 8/1956 | Truter ............ 440/12.62 |
| 3,397,669 | A | * | 8/1968 | Katehis ............ 440/12.62 |

(Continued)

FOREIGN PATENT DOCUMENTS

| | | |
|---|---|---|
| KR | 20-1995-0008594 Y1 | 10/1995 |
| KR | 10-2002-0007939 A | 1/2002 |
| KR | 10-2005-0072045 A | 7/2005 |

OTHER PUBLICATIONS

International Search Report of PCT/KR2012/001624 mailed on Oct. 25, 2012 from ISA/KR.

*Primary Examiner* — S. Joseph Morano
*Assistant Examiner* — Andrew Polay
(74) *Attorney, Agent, or Firm* — Revolution IP, PLLC

(57) ABSTRACT

Disclosed is a bicycle for water and land including: a first floating means, which is provided on and rotates with a front wheel frame that rotates in conjunction with a handlebar, for unfolding on both sides by means of buoyancy to buoy the front wheel frame when entering water; a second floating means, which is provided on a rear wheel frame, for unfolding on both sides by means of buoyancy to buoy the rear wheel frame when entering water; and propellers, which are provided on a plurality of spokes that are installed on the rear wheel frame so that the surfaces face the direction in which the rear wheel rotates, for generating propelling force in water.

9 Claims, 5 Drawing Sheets

(56) References Cited

U.S. PATENT DOCUMENTS 3,848,560 A * 11/1974 Du Bose ............... 440/12.68
4,559,892 A * 12/1985 Cascallana ............ 440/12.62
6,050,864 A *  4/2000 Perdue ..................... 440/21

* cited by examiner

BICYCLE FOR WATER AND LAND

CROSS REFERENCE TO PRIOR APPLICATIONS

This application is a National Stage Application of PCT International Patent Application No. PCT/KR2012/001624 filed on Mar. 6, 2012, under 35 U.S.C. §371, which claims priority to Korean Patent Application No. 10-2011-0020485 filed on Mar. 8, 2011, which are all hereby incorporated by reference in their entirety.

TECHNICAL FIELD

The present invention relates to a bicycle for water and land, and more particularly, to a bicycle for water and land that is capable of reducing its volume or width if used on land and maximizing its buoyancy and propelling forces if used in water, thereby providing many conveniences in use.

BACKGROUND ART

Generally, a bicycle is useful equipment for leisure activities of modern people or means of transportation in view of its exercising effect and its available space.

So as to allow the bicycle to be freely used in water as well as on land, accordingly, many studies on the bicycle for water and land have been made in different ways.

One conventional bicycle for water and land has air bags mounted on both sides thereof or on the outside thereof so as to float on water, and generates its propelling force through the rotation of pedals so as to be movable.

In case of the conventional bicycle for water and land, however, it is used in the state where the air bags are mounted thereon if used on land, thereby making it hard to maintain the balance thereof and further making it almost impossible to conduct the riding.

Even if the riding is conducted, the width of the bicycle is large to undesirably give many inconveniences to other pedestrians or moving vehicles, and even though the air bags are spaced apart from the land surface, they may be brought into contact with land, thereby undesirably being damaged and broken and accordingly making it impossible to be used in water.

Accordingly, there is a need for the development of a new bicycle for water and land capable of being used in water as well as on land.

DISCLOSURE

Technical Problem

Accordingly, the present invention has been made in view of the above-mentioned problems occurring in the prior art, and it is an object of the present invention to provide a bicycle for water and land that is capable of floating on water through a first floating means mounted on a front wheel frame in such a manner as to be folded downward on land and developed to both sides thereof on water by means of buoyancy generated when entering water and a second floating means mounted on a rear wheel frame in such a manner as to be developed to both sides of the bicycle on water by means of buoyancy generated when entering water, and that is capable of generating a propelling force on water through a plurality of propellers mounted on the rear wheel rotated by means of the rotation of pedals.

Technical Solution

To accomplish the above object, according to the present invention, there is provided a bicycle for water and land including: a first floating means provided on and rotating together with a front wheel frame rotating in conjunction with a handlebars, in such a manner as to be developed to both sides thereof by means of buoyancy generated when entering water to float the front wheel frame; a second floating means provided on a rear wheel frame in such a manner as to be developed to both sides thereof by means of buoyancy generated when entering water to float the rear wheel frame; and a plurality of propellers provided on a plurality of spokes disposed on the rear wheel frame in such a manner as to rotate together with the rear wheel frame to generate a propelling force therefrom.

According to the present invention, desirably, the first floating means includes: a first base frame fixed to the front wheel frame; a pair of first wings rotatable to both sides of the first base frame in such a manner as to be developed upward by means of buoyancy and to be rotated downward and folded if the buoyancy disappears; first stoppers adapted to restrict the developing angles of the pair of first wings; rudders rotatable on the inner surfaces of the pair of wings in such a manner as to have lower end portions oriented downward, while being folded to the inner surfaces of the pair of first wings if the pair of first wings is folded and being increased in the separated angles from the inner surfaces of the pair of first wings if the pair of first wings is developed, thereby conducting the steering in the advancing direction of the bicycle; and a first fixing means adapted to fix the pair of first wings folded downward to the front wheel frame.

According to the present invention, desirably, the first stoppers have a link structure foldable one or more times.

According to the present invention, desirably, the rudders are substantially heavy in weight on the lower end portions thereof in such a manner as to be automatically moved downward upon the development of the pair of first wings and have a maximum development angle between 80° and 100° from the pair of first wings.

According to the present invention, desirably, the first fixing means is formed of a magnetic material.

According to the present invention, desirably, the second floating means includes: a second base frame fixed to the rear wheel frame; a pair of second wings rotatable to both sides of the second base frame in such a manner as to be developed upward by means of buoyancy and to be rotated downward and folded if the buoyancy disappears; second stoppers adapted to restrict the developing angles of the pair of second wings; and a second fixing means adapted to fix the pair of second wings folded downward to the rear wheel frame.

According to the present invention, desirably, the second floating means further includes rudders provided rotatably on the inner surfaces of the pair of second wings in such a manner as to be oriented downward on the lower end portions thereof, while being folded to the inner surfaces of the pair of second wings if the pair of second wings is folded and increasing the separated angles from the inner surfaces of the pair of second wings if the pair of second wings is developed, thereby holding the balance of the bicycle.

According to the present invention, desirably, the rudders are substantially heavy in weight on the lower end portions thereof in such a manner as to be automatically moved downward upon the development of the pair of second wings and have a maximum development angle between 80° and 100° from the pair of second wings.

According to the present invention, desirably, the second fixing means is formed of a magnetic material.

According to the present invention, desirably, the buoyancy of the second floating means is higher than that of the first floating means.

According to the present invention, desirably, the propellers are increased in width from one ends thereof toward the other ends thereof, and one ends of the propellers are located on the rotary center of the rear wheel or on the outer periphery of the rear wheel.

Advantageous Effects

According to the present invention, the bicycle for water and land can be ridden in water as well as on land, thereby being conveniently used as the means of exercise and transportation in very useful and effective ways.

BEST MODE FOR INVENTION

Hereinafter, an explanation on a bicycle for water and land according to the present invention will be in detail given with reference to the attached drawings.

While the present invention will be described with reference to the particular illustrative embodiments, it is not to be restricted by the embodiment but only by the appended claims. It is to be appreciated that those skilled in the art can change or modify the embodiments without departing from the scope and spirit of the present invention.

Figure 1:
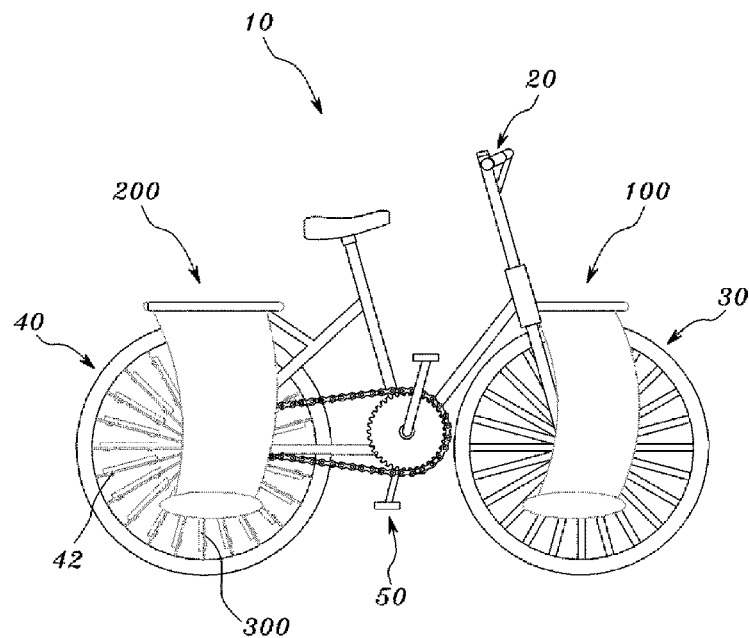
FIG. 1 is a perspective view showing a bicycle for water and land according to the present invention.
Figure 2:
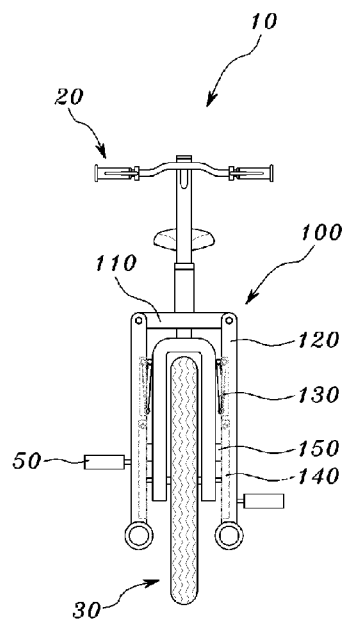
FIG. 2 is a front view showing a first floating means of the bicycle for water and land according to the present invention.
Figure 3:
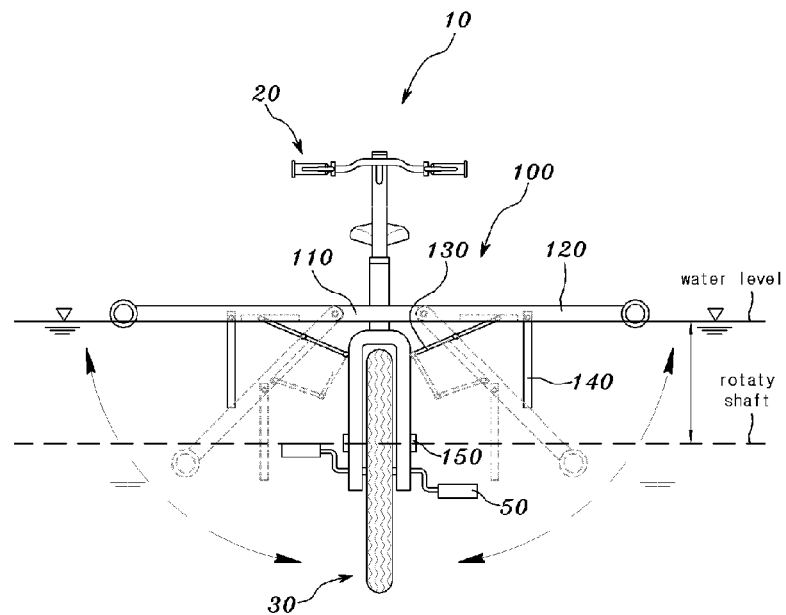
FIG. 3 is a front view showing an operating state of the first floating means of the bicycle for water and land according to the present invention.
Figure 4:
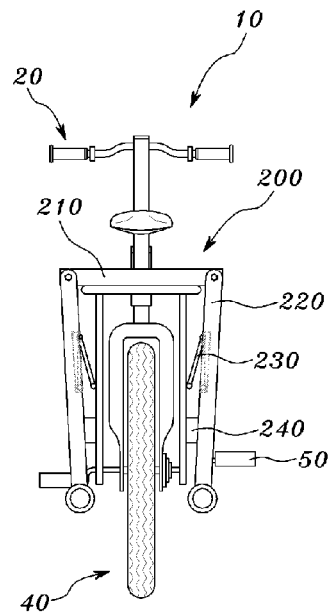
FIG. 4 is a rear view showing a second floating means of the bicycle for water and land according to the present invention.
Figure 5:
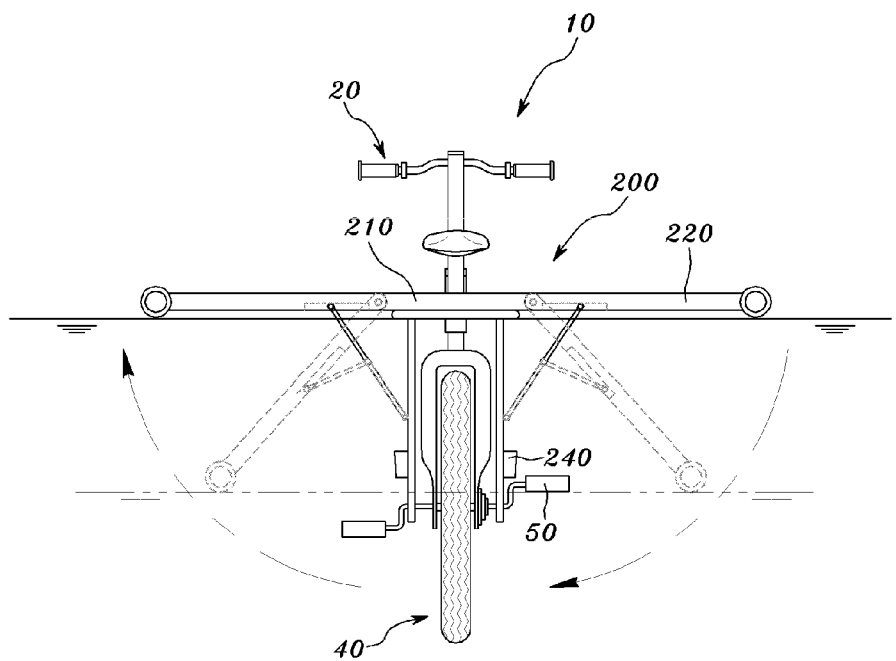
FIG. 5 is a rear view showing an operating state of the second floating means of the bicycle for water and land according to the present invention.
Figure 6:
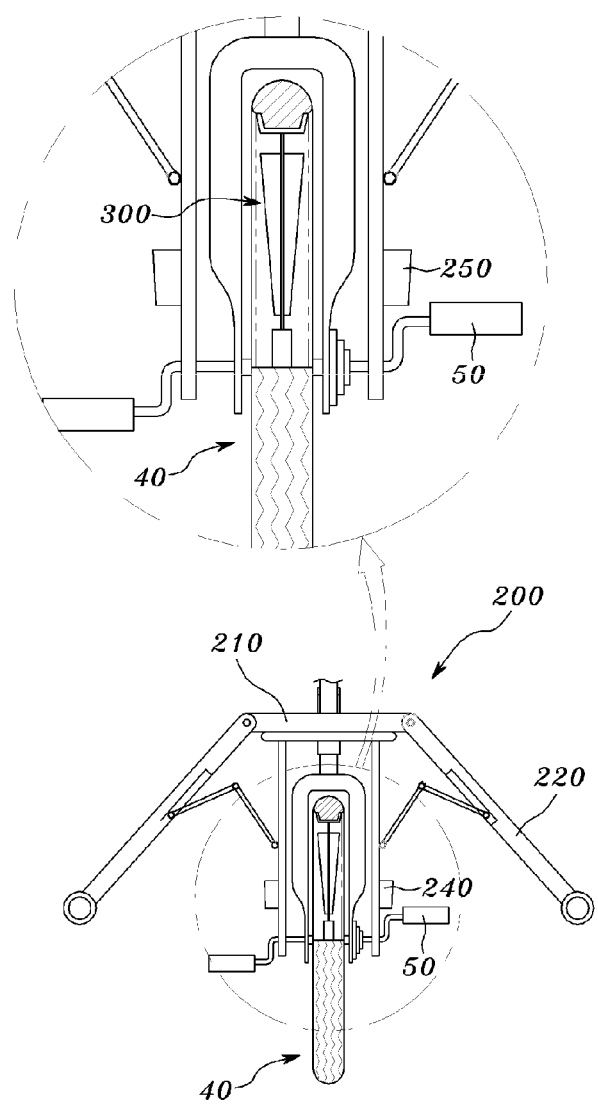
FIG. 6 is an enlarged view showing propellers of the bicycle for water and land according to the present invention.
Figure 7:
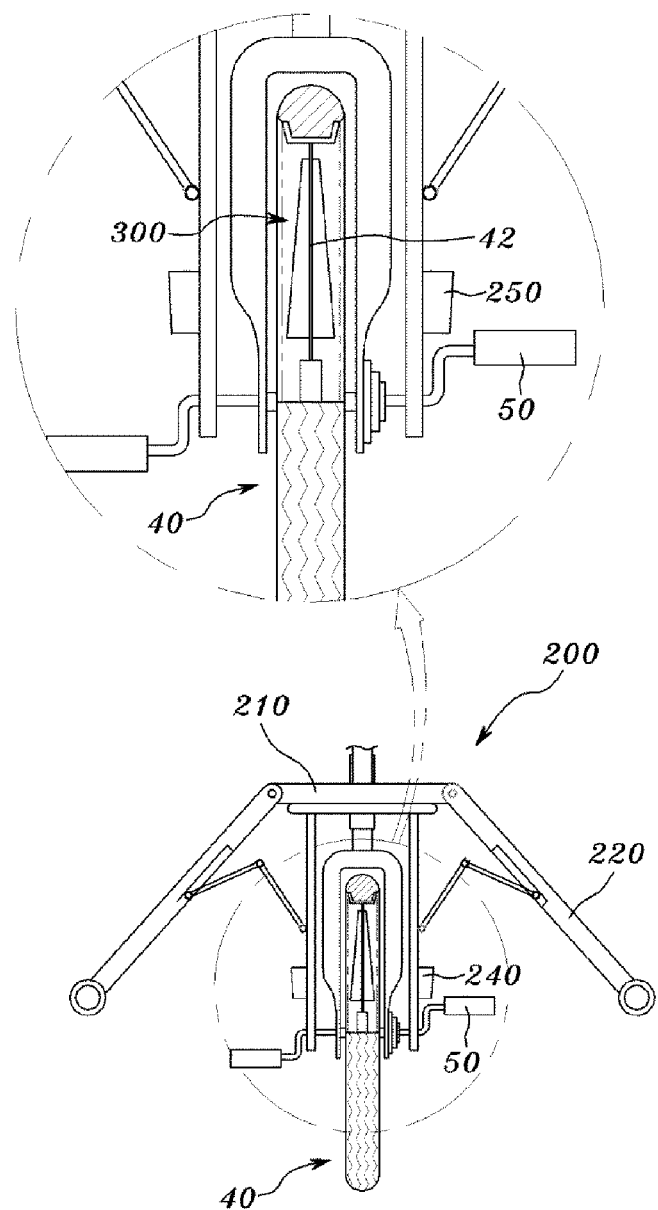
FIG. 7 is an enlarged view showing another example of the propellers of the bicycle for water and land according to the present invention.

FIG. 1 is a perspective view showing a bicycle for water and land according to the present invention, FIG. 2 is a front view showing a first floating means of the bicycle for water and land according to the present invention, FIG. 3 is a front view showing an operating state of the first floating means of the bicycle for water and land according to the present invention, FIG. 4 is a rear view showing a second floating means of the bicycle for water and land according to the present invention, FIG. 5 is a rear view showing an operating state of the second floating means of the bicycle for water and land according to the present invention, FIG. 6 is an enlarged view showing propellers of the bicycle for water and land according to the present invention, and FIG. 7 is an enlarged view showing another example of the propellers of the bicycle for water and land according to the present invention.

As shown, a bicycle 10 for water and land according to the present invention largely includes a first floating means 100, a second floating means 200 and propellers 300.

The first floating means 100 is provided on and rotates together with a front wheel frame 30 rotating in conjunction with handlebars 20, in such a manner as to be developed to both sides thereof by means of buoyancy generated when entering water to float the front wheel frame 30.

The second floating means 200 is provided on a rear wheel frame 40 in such a manner as to be developed to both sides thereof by means of buoyancy generated when entering water to float the rear wheel frame 40.

The propellers 300 are provided on a plurality of spokes 42 disposed on the rear wheel frame 40 in such a manner as to rotate together with the rear wheel frame 40 to generate a propelling force therefrom.

The surfaces of the propellers 300 are disposed in a direction in which a rear wheel rotates in such a manner as to face the advancing direction of the bicycle 10, so that upon the rotation of pedals 50, the propellers 300 rotate to generate the propelling force therefrom.

If the handlebars 20 rotate for steering, the first floating means 100 rotates in the same direction as the handlebars 20, thereby preventing the bicycle 10 from being inclined or turned over.

As shown in FIGS. 2 and 3, the first floating means 100 includes a first base frame 110, a pair of first wings 120, first stoppers 130, rudders 140, and a first fixing means 150.

The first base frame 110 is fixed to the front wheel frame 30, and the pair of first wings 120 is rotatable to both sides of the first base frame 110 in such a manner as to be developed upward by means of buoyancy and to be rotated downward and folded if the buoyancy disappears.

The first stoppers 130 restrict the developing angles of the pair of first wings 120, and the rudders 140 are rotatable on the inner surfaces of the pair of wings 120 in such a manner as to have lower end portions oriented downward.

The rudders 140 are folded to the inner surfaces of the pair of first wings 120 if the pair of first wings 120 is folded and are increased in the separated angles from the inner surfaces of the pair of first wings 120 if the pair of first wings 120 is developed, thereby maintaining the whole balance of the bicycle 10.

Further, the first fixing means 150 is adapted to fix the pair of first wings 120 folded downward to the front wheel frame 30, and if the bicycle 10 is used on land, the first fixing means 150 fixes the pair of first wings 120 in the folded state to the front wheel frame 30, thereby minimizing the volume of the bicycle 10.

At this time, the first fixing means 150 may fix the pair of first wings 120 to the first base frame 110.

Further, the first stoppers 130 have a link structure foldable one or more times. According to the present invention, the intermediate portions of the first stoppers 130 are desirably folded while moving to the hinge directions of the pair of first wings 120.

The rudders 140 are substantially heavy in weight on the lower end portions thereof and desirably have balance weights mounted on the lower end portions thereof. As shown in FIG. 3, the rudders 140 are automatically moved downward upon the development of the pair of first wings 120.

The rudders 140 are desirably provided flexibly within a maximum development angle between 80° and 100° of the developed first wings 120 in accordance with the changed water surface and the horizontal position of the bicycle.

Further, the first fixing means 150 is formed of a magnetic material and may be detachably mounted on each of the pair of first wings 120 and the front wheel frame 30. Alternatively, the magnetic material may be mounted on one of the pair of first wings 120 and the front wheel frame 30, and a piece having an iron component may be mounted on the other.

As shown in FIGS. 4 and 5, the second floating means 200 includes a second base frame 210, a pair of second wings 220, second stoppers 230, and a second fixing means 240.

The second base frame 210 is fixed to the rear wheel frame 40, and the pair of second wings 220 is rotatable to both sides of the second base frame 210 in such a manner as to be developed upward by means of buoyancy and to be rotated downward and folded if the buoyancy disappears.

The second stoppers 230 restrict the developing angles of the pair of second wings 220 and have a link structure foldable one or more times. According to the present invention, the intermediate portions of the second stoppers 230 are desirably folded while moving to the hinge directions of the pair of second wings 220.

Further, the second fixing means 240 is adapted to fix the pair of second wings 220 folded downward to the rear wheel frame 40, and if the bicycle 10 is used on land, the second fixing means 240 fixes the pair of second wings 220 in the folded state to the rear wheel frame 40, thereby minimizing the volume of the bicycle 10.

At this time, the second fixing means 240 may fix the pair of second wings 220 to the second base frame 210.

Further, rudders (not shown) may be provided rotatably on the inner surfaces of the pair of second wings 220 in such a manner as to be oriented downward on the lower end portions thereof. Desirably, the rudders have balance weights mounted on the lower end portions thereof.

If the pair of second wings 220 is folded, the rudders are folded to the inner surfaces of the pair of second wings 220, and if the pair of second wings 220 is developed, the rudders are automatically moved downward in such a manner as to increase the separated angle from the inner surfaces of the pair of second wings 220, thereby holding the balance of the rear wheel frame 40.

In this case, the rudders are desirably provided flexibly within a maximum development angle between 80° and 100° of the developed second wings 220 in accordance with the changed water surface and the horizontal position of the bicycle.

Further, the second fixing means 240 is formed of a magnetic material and may be detachably mounted on each of the pair of second wings 220 and the rear wheel frame 40. Alternatively, the magnetic material may be mounted on one of the pair of second wings 220 and the rear wheel frame 40, and a piece having an iron component may be mounted on the other.

The buoyancy of the second floating means 200 is higher than that of the first floating means 100, and when a rider sits on a bicycle, the rider's weight is generally applied to the rear wheel rather than the front wheel, so that the rear wheel is submerged more deeply than the front wheel.

Accordingly, the buoyancy of the second floating means 200 is higher than that of the first floating means 100, so that the bicycle 10 can be maintained in a horizontal state, while preventing the rear wheel from being first dropped to the water.

As shown in FIGS. 6 and 7, the propellers 300 are increased in width from one ends thereof toward the other ends thereof, and one ends of the propellers 300 are located on the rotary center of the rear wheel or on the outer periphery of the rear wheel.

One ends of the propellers 300 are located on the rotary center of the rear wheel, as shown in FIG. 6, and in this case, the other ends of the propellers 300 larger than one ends thereof have substantially great radius to increase water-stirring distance, thereby generating a high propelling force therefrom.

On the other hand, one ends of the propellers 300 are located on the outer periphery of the rear wheel, as shown in FIG. 7, and in this case, the other ends of the propellers 300 larger than one ends thereof are located on the rotary center of the rear wheel.

In this case, the propelling force generated in water is lower than that in FIG. 6, but if the bicycle 10 is used on land, wind or air resistance is lower than that in FIG. 6, thereby being advantageous upon the use on land.

The widths of one ends or the other ends of the propellers 300 are not limited specially, but for the riding on land, they are desirably smaller than the width of the rear wheel. So as to increase the propelling force in water, on the other hand, they are larger than the width of the rear wheel, while of course avoiding the contact with the pair of second wings 220 being folded of the second floating means 200.

The invention claimed is:

1. A bicycle for water and land comprising:
   a first floating means provided on and rotating together with a front wheel frame rotating in conjunction with handlebars, in such a manner as to be developed to both sides thereof by means of buoyancy generated when entering water to float the front wheel frame;
   a second floating means provided on a rear wheel frame in such a manner as to be developed to both sides thereof by means of buoyancy generated when entering water to float the rear wheel frame; and
   a plurality of propellers provided on a plurality of spokes disposed on the rear wheel frame in such a manner as to rotate together with the rear wheel frame to generate a propelling force therefrom,
   wherein the first floating means comprises:
   a first base frame fixed to the front wheel frame;
   a pair of first wings rotatable to both sides of the first base frame in such a manner as to be developed upward by means of buoyancy and to be rotated downward and folded if the buoyancy disappears;
   first stoppers adapted to restrict the developing angles of the pair of first wings;
   rudders rotatable on the inner surfaces of the pair of wings in such a manner as to have lower end portions oriented downward, while being folded to the inner surfaces of the pair of first wings if the pair of first wings is folded and being increased in the separated angles from the inner surfaces of the pair of first wings if the pair of first wings is developed, thereby conducting the steering in the advancing direction of the bicycle; and
   a first fixing means adapted to fix the pair of first wings folded downward to the front wheel frame, and
   wherein the first floating means and the second floating means are provided on the upper end portions of the front wheel frame and the rear wheel frame and are automatically developed upward from the upper end portions of the front wheel frame and the rear wheel frame by means of buoyancy if the bicycle is located in water, so that they are located over the rotary shafts of the wheels of the front wheel frame and the rear wheel frame, while being automatically folded by means of their self weight if the bicycle is escaped from water, and the rudders of the first floating means are substantially heavy in weight on the lower end portions thereof in such a manner as to be automatically moved downward upon the development of the pair of first wings.

2. The bicycle for water and land according to claim 1, wherein the first stoppers have a link structure foldable one or more times.

3. The bicycle for water and land according to claim 1, wherein the first fixing means is formed of a magnetic material.

4. The bicycle for water and land according to claim 1, wherein the second floating means comprises:
   a second base frame fixed to the rear wheel frame;
   a pair of second wings rotatable to both sides of the second base frame in such a manner as to be developed upward by means of buoyancy and to be rotated downward and folded if the buoyancy disappears;
   second stoppers adapted to restrict the developing angles of the pair of second wings; and
   a second fixing means adapted to fix the pair of second wings folded downward to the rear wheel frame.

5. The bicycle for water and land according to claim 4, wherein the second floating means further comprises rudders provided rotatably on the inner surfaces of the pair of second wings in such a manner as to be oriented downward on the lower end portions thereof, while being folded to the inner surfaces of the pair of second wings if the pair of second wings is folded and increasing the separated angles from the inner surfaces of the pair of second wings if the pair of second wings is developed, thereby holding the balance of the bicycle.

6. The bicycle for water and land according to claim 5, wherein the rudders are substantially heavy in weight on the lower end portions thereof in such a manner as to be automatically moved downward upon the development of the pair of second wings and have a maximum development angle between 80° and 100° from the pair of second wings.

7. The bicycle for water and land according to claim 4, wherein the second fixing means is formed of a magnetic material.

8. The bicycle for water and land according to claim 1, wherein the buoyancy of the second floating means is higher than that of the first floating means.

9. The bicycle for water and land according to claim 1, wherein the propellers are increased in width from one ends thereof toward the other ends thereof, and one ends of the propellers are located on the rotary center of the rear wheel or on the outer periphery of the rear wheel.

* * * * *